(12) United States Patent
Eberth

(10) Patent No.: US 7,997,534 B2
(45) Date of Patent: Aug. 16, 2011

(54) CONNECTING STRUCTURE FOR AN AIRCRAFT OR SPACECRAFT AND METHOD FOR PRODUCING THE SAME

(75) Inventor: Ulrich Eberth, Rain (DE)

(73) Assignee: Airbus Operations GmbH, Hamburg (DE)

( * ) Notice: Subject to any disclaimer, the term of this patent is extended or adjusted under 35 U.S.C. 154(b) by 577 days.

(21) Appl. No.: 11/974,246

(22) Filed: Oct. 12, 2007

(65) Prior Publication Data

US 2008/0210824 A1 Sep. 4, 2008

Related U.S. Application Data

(60) Provisional application No. 60/851,497, filed on Oct. 13, 2006.

(51) Int. Cl.
*B64C 1/06* (2006.01)
(52) U.S. Cl. ............. 244/131; 244/132; 244/123.1; 244/123.4
(58) Field of Classification Search ............ 244/131, 244/132, 123.1, 123.4, 117 R, 119
See application file for complete search history.

(56) References Cited

U.S. PATENT DOCUMENTS

| | | | | | |
|---|---|---|---|---|---|
| 3,468,747 | A | * | 9/1969 | Tatnall | 442/10 |
| 4,331,723 | A | * | 5/1982 | Hamm | 428/61 |
| 6,709,538 | B2 | * | 3/2004 | George et al. | 156/73.3 |
| 7,052,573 | B2 | * | 5/2006 | Pham et al. | 156/286 |
| 2003/0168555 | A1 | * | 9/2003 | Livi et al. | 244/132 |
| 2006/0147704 | A1 | * | 7/2006 | Pham et al. | 428/332 |

FOREIGN PATENT DOCUMENTS

| | | |
|---|---|---|
| DE | 3836442 | 5/1990 |
| DE | 4139523 | 6/1993 |

* cited by examiner

*Primary Examiner* — Tien Dinh
*Assistant Examiner* — Justin Benedik
(74) *Attorney, Agent, or Firm* — Greer, Burns & Crain, Ltd.

(57) ABSTRACT

The present invention relates to a connecting structure for an aircraft or spacecraft, with a structural component and a stringer. The stringer is connected to the structural component by means of connecting regions. In order to reduce stress peaks that result for example from impact in the structural component, a high impact material is introduced into at least one of the connecting regions to provide a local increase in the energy absorbing capacity of the at least one connecting region.

16 Claims, 4 Drawing Sheets

CONNECTING STRUCTURE FOR AN AIRCRAFT OR SPACECRAFT AND METHOD FOR PRODUCING THE SAME

CROSS-REFERENCE TO RELATED APPLICATIONS

This application claims the benefit of U.S. Provisional Application No. 60/851,497, filed Oct. 13, 2006, the entire disclosure of which is herein incorporated by reference.

FIELD OF THE INVENTION

The present invention relates to a connecting structure for an aircraft or spacecraft and to a method for producing such a connecting structure for an aircraft or spacecraft.

BACKGROUND OF THE INVENTION

Although it can be applied to any desired connecting structures, the present invention and the problems on which it is based are explained in more detail with reference to a fuselage shell of an aircraft stiffened by means of stringers.

Fuselage shells and stringers are increasingly being produced from fiber composite materials, in particular from carbon fiber reinforced plastic (CRP). Fuselage shells and stringers have in this case a construction comprising a number of layers of laid fiber fabric which are joined to one another by means of a cured resin matrix, in particular epoxy resin. Typically used as stringers for stiffening the fuselage shell are T stringers, which have a foot, at which they are connected to the fuselage shell, and a web portion, which extends substantially perpendicularly in relation to the fuselage shell. In this case, the foot of the T stringer is connected to the fuselage shell by means of the resin matrix.

Under normal operating conditions of an aircraft, tensile, compressive and shearing stresses act in the fuselage shell parallel to the plane of the fuselage shell. In addition, a major portion of the fuselage shell is subjected to forces acting perpendicularly in relation to the plane of the fuselage shell, which are produced by the pressure difference between the cabin and the surroundings. In addition, the fuselage shell is occasionally exposed to impact, that is to say brief, intensive force effects. An example of such impact is a piece of rubber of a tyre torn to pieces on landing, which hits the fuselage shell at high speed.

Such instances of impact in such fuselage shells of fiber composite material are often the initial cause of damage in the fuselage shell. They involve a flux of force starting from the impact and extending along the fuselage shell via the foot of the T stringer into the web portion of the T stringer. In particular in the lateral connecting regions of the end of the T stringer foot and the foot region of the T stringer, which lies directly underneath the web portion of the T stringer, very great stress peaks briefly occur in the resin matrix. The consequence is then a brittle fracture of the resin matrix in these connecting regions. Then the T stringer becomes detached from the fuselage shell and a catastrophic collapse of the latter occurs.

SUMMARY OF THE INVENTION

An object of the present invention is to provide an improved connecting structure between a structural component and a stringer, it being intended in particular to prevent detachment of the stringer from the structural component under the effect of impact.

This object is achieved according to the invention by a connecting structure with the features of Patent Claim 1 or by a method for producing a connecting structure with the features of Patent Claim 11.

Accordingly, a connecting structure for an aircraft or spacecraft with a structural component and a stringer, which is connected to the structural component by means of connecting regions, is provided. A high impact material is introduced into at least one of the connecting regions to provide a local increase in the energy absorbing capacity of the at least one connecting region.

Furthermore, a method for producing such a connecting structure for an aircraft or spacecraft is provided. The method steps are briefly described below. Firstly, a structural component and a stringer, which can be connected to one another by means of connecting regions, are provided. Then, a high impact material is introduced into at least one of the connecting regions to provide a local increase in the energy absorbing capacity of the at least one connecting region. Joining together of the structural component and the stringer by means of the connecting regions may in this case be performed before or after the introduction of the high impact material.

The idea on which the present invention is based is that the stress peaks resulting from the impact in the connecting regions between the fuselage shell and the stringer are damped by a high impact material. Failure of the resin material or the connection between the structural component and the stringer consequently no longer occurs. Accordingly, detachment of the stringer from the fuselage shell, for example as the result of impact, and consequently the catastrophic collapse of the fuselage shell, can be advantageously prevented by means of the invention. Consequently, a more stable, and consequently safer, connecting structure is created.

Advantageous refinements and improvements of the invention can be found in the subclaims.

In this patent application, a "structural component" is to be understood as meaning in particular components of a sheet-like form, for example fuselage shells, wing shells or rudder shells.

In the present application, high impact materials are materials that have a much higher energy absorbing capacity than epoxy resin. "Energy absorbing capacity" is understood as meaning the absorption of mechanical work without causing failure of the high impact material.

In this application, "joining together" is to be understood as any joining in the sense of the DIN standard on joining, with placement, insertion, riveting, screwing, sewing and adhesive bonding coming into consideration in particular.

According to one particular embodiment of the invention, the high impact material is a thermoplastic material. In this application, "thermoplastic material" is understood as meaning a material that consists 100% of thermoplastic, that is to say for example of polyethylene and/or polyamide. In this application, however, "thermoplastic material" is also to be understood as meaning mixtures (these are then also referred to as modified matrices) of resin, in particular epoxy resin, polymer fibers and thermoplastics. The thermoplastic component of the thermoplastics in the thermoplastic material is specified hereafter in percentages by weight, that is to say with respect to the total weight of the thermoplastic material, comprising polymer fibers and/or resin and/or thermoplastic.

According to another embodiment of the invention, the structural component comprises a fiber composite material and/or the stringer comprises a fiber composite material. Fiber composite materials are to be preferred in aerospace because of their low weight along with high strength. However, it may alternatively also be provided that, for example, the structural component is produced from metal, in particular from an aluminium alloy, and only the stringer comprises a fiber composite material. It goes without saying that it is also possible for only the stringer to be produced from metal, in particular an aluminium alloy, and the structural component to comprise a fiber composite material. The fiber composite materials of the stringer and of the structural component may have the same or different compositions. These measures allow an optimization of the connecting structure with regard to strength and weight.

According to one embodiment of the invention, the thermoplastic material has a greater thermoplastic component than the respective fiber composite materials. This produces a greater energy absorbing capacity in specific connecting regions.

A "connecting region" is to be understood in the present case as a region in which the stringer is connected to the structural component. A number of regions are obtained if one region comprises the high impact material and another region does not comprise this high impact material.

According to another embodiment of the invention, the thermoplastic component of the thermoplastic material amounts to between 5% and 100%, in particular between 50% and 80%, with further preference between 60% and 70%. Such a thermoplastic component is optimal with respect to the energy absorbing capacity, while adequate strength, that is to say maximum tensile, compressive and shearing stress, is still ensured in the connecting regions that comprise the thermoplastic material.

In the case of yet another embodiment of the invention, the stringer has a foot portion, in which it rests on the skin shell, and/or a web portion, which is aligned substantially perpendicularly in relation to the skin shell. Such stringers can on the one hand be fastened well to sheet-like structural components and on the other hand sufficiently stiffen the structural component.

For example, the thermoplastic material is arranged in the region of the foot portion, in particular in the area of the region of the foot portion that is facing away from the web portion, and/or in the region of the web portion. "In the region" is understood here as meaning for example just a few centimetres, in particular a distance of 0 cm to 5 cm, from the web portion or the ends of the foot portion. When there is impact in the fuselage shell, a flux of force occurs from the plane of the fuselage shell initially into the end regions of the foot portions of the stringer, through the foot portions and into the web portion. The flux of force thereby changes its direction several times, with increased loading occurring at the points of directional changes. It therefore helps to achieve the intended aim to provide the stringer with thermoplastic material in these very regions, in order to provide increased energy absorbing capacity in these regions.

According to a further embodiment of the invention, the thermoplastic material is arranged between the foot portion and the structural component. Such local introduction of the thermoplastic material can be realized easily in terms of production technology.

According to one embodiment, the thermoplastic material is a sewing thread, in particular as a thermoplastic filament. A "thermoplastic filament" is to be understood in this application as meaning a filament that consists 100% of thermoplastic. Such sewing can be realized efficiently in terms of production technology and allows targeted introduction of the thermoplastic material into the connecting structure. It has been determined in technical tests that the thermoplastic filaments do not come apart when the connecting structure is exposed to pressure or heat, in particular during the curing of the connecting structure of fiber composite materials.

The sewing thread preferably forms a seam, which takes place in the longitudinal direction of the stringer and sews the stringer foot to the structural component. This has the effect of making it easy to produce while obtaining a favourable flux of force.

In the case of an exemplary embodiment, the sewing thread joins the foot portion, in particular in its end region and/or in the region of the web portion, to the structural component. This arrangement is even more favourable with respect to the flux of force resulting from impact.

In the case of a further embodiment of the invention, the thermoplastic material is a sheet-like textile formation, laid fiber fabric and/or crosslinked thermoplastic grains. In particular in the case of connecting structures of fiber composite materials, thermoplastic materials formed in this way can be placed very easily into the laid fiber fabric of the structural component or of the stringer and in this way be efficiently processed. Furthermore, a good bond between the thermoplastic material and the laid fiber fabrics of the structural component and/or of the stringer is achieved.

The stringer may be formed as a T, Z, C, L or Ω stringer. Depending on the load case, consequently a form of the stringer that is optimal for a specific application can be provided.

According to a further embodiment of the invention, the structural component is a skin shell, in particular a fuselage shell of the aircraft.

In the case of a further exemplary embodiment of the invention, the first and/or the second fiber composite material comprises CRP, in particular CRP prepreg material, or is based on semifinished textile products, such as woven or laid fabrics or the like. CRP has a high strength with a low weight. CRP prepreg material is additionally easy to process.

According to a further embodiment of the invention, fastening means, in particular screws or rivets, for connecting the stringer to the structural component are provided.

In addition or as an alternative to fastening of the stringer to the structural component by means of the resin matrix and/or the high impact material, fastening means which can absorb further energy from the impact may be provided.

According to a further embodiment of the method according to the invention, the arrangement comprising the structural component, the stringer and the connecting regions is cured by means of pressure and/or heat to form the connecting structure. Accordingly, the structural component, the stringer and the connecting regions are joined together in the dry or wet state and subsequently cured.

According to a further improvement of the method according to the invention, a resin matrix is introduced into the structural component and the stringer. For the case where the structural component and/or the stringer are provided as dry semifinished products, a resin matrix must be introduced in the course of the method for producing the connecting structure.

"Dry" fibers are to be understood in this application as meaning fibers not yet impregnated with resin. On the other hand, "wet" fibers are intended to mean fibers already impregnated in resin but not yet cured. Furthermore, "fiber semifinished product" is to be understood as meaning in particular laid fiber fabrics, in particular unidirectional laid fiber fabrics, woven mats or fiber mats.

According to an exemplary embodiment of the method according to the invention, the structural component or the stringer is provided as a semifinished fiber product, prepreg material or at least partially cured fiber composite material. There are consequently a large number of combinational possibilities with regard to the materials that are provided for forming the structural component and/or the stringer.

For example, dry laid fiber fabrics may be combined with already cured web portions of stringers, the stringer feet being provided for example from prepreg material.

According to a further embodiment of the method according to the invention, it comprises a hand lay-up, prepreg, transfer moulding and/or vacuum infusion process. For the case where the structural component and/or the stringer are provided in the dry state, it may be advantageous in production technology terms to introduce the resin matrix into the laid fiber fabric by means of the vacuum infusion process.

BRIEF DESCRIPTION OF THE DRAWINGS

The invention is explained in more detail below on the basis of exemplary embodiments with reference to the accompanying figures of the drawing, in which.

In all the figures of the drawing, elements that are the same or functionally the same have in each case been provided with the same reference numerals, unless otherwise indicated.

DETAILED DESCRIPTION OF THE INVENTION

Figure 1:
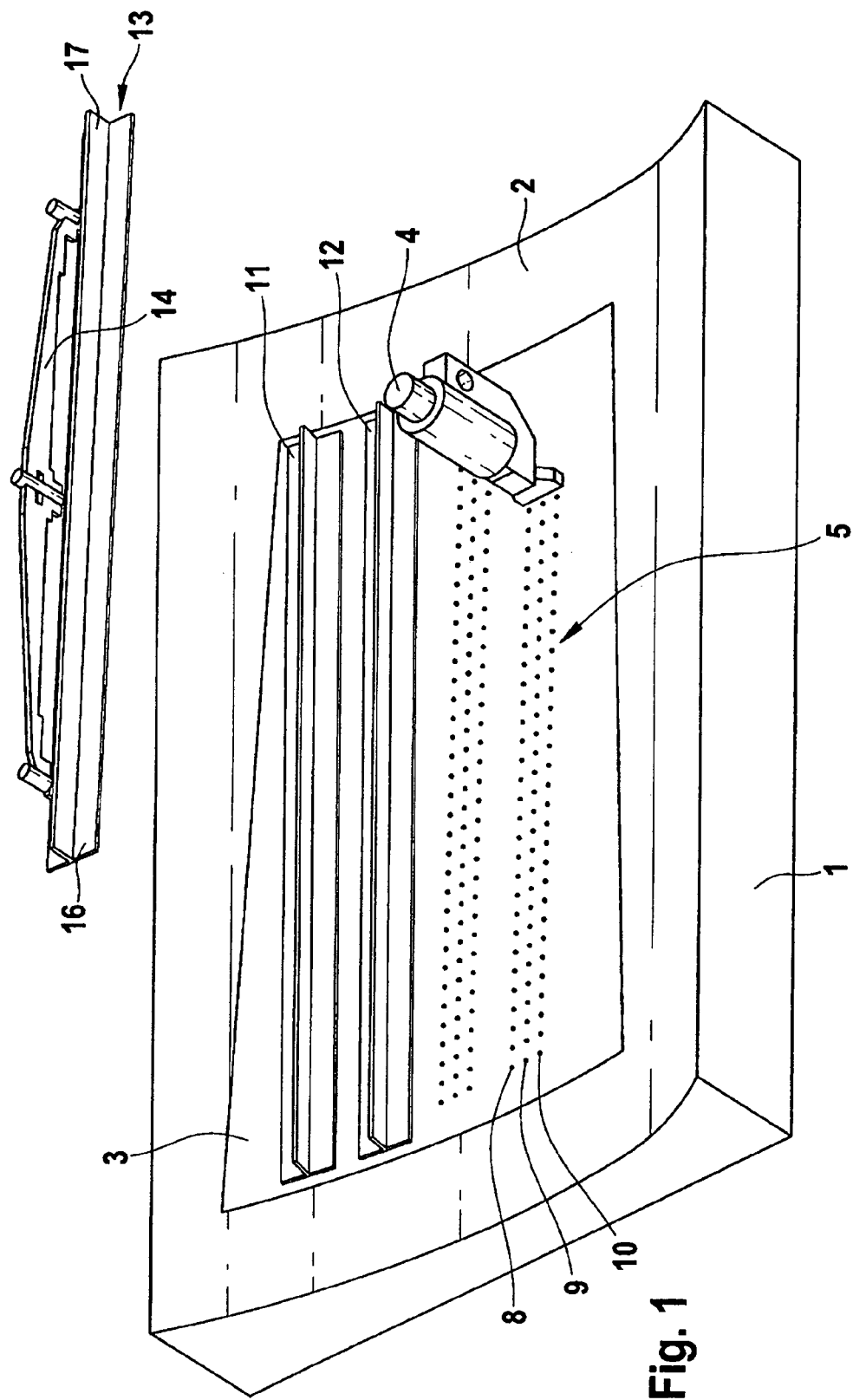
FIG. 1 shows a state of the method in the production of a connecting structure according to an exemplary embodiment of the present invention, thermoplastic material being arranged over a large surface area between a skin shell and a stringer.

FIG. 1 shows a laminating device 1, which has a contour 2. The contour 2 is of such a form that it shapes a skin shell 3, for example a fuselage shell of an aircraft, the skin shell for example being constructed from not yet cured layers of CRP material.

An application device 4 applies a thermoplastic material 5 to the skin shell 3. In this exemplary embodiment, the thermoplastic material 5 may have, in terms of percentages by weight, a composition of 40% polyethylene and 60% epoxy resin.

The application of the thermoplastic material 5 is thereby performed along a number of parallel connecting regions, preferably three parallel connecting regions 8, 9 and 10. The thermoplastic material 5 is applied here as powder. Equally, however, laid fiber fabrics of thermoplastic material could also be placed on and/or arranged such that they overlap with the fibers of the skin shell. Subsequently, T stringers 11, 12 and 13 are laid by means of a laying device 14 onto the connecting regions 8, 9, 10 on the skin shell 3.

The T stringers 11, 12 and 13 are likewise provided from CRP material and are only partially cured. The T stringers 11, 12 and 13 are set down with their foot 16 on the skin shell 3, a web portion 17 then extending perpendicularly in relation to the foot 16, and consequently in relation to the skin shell 3.

Figure 2:
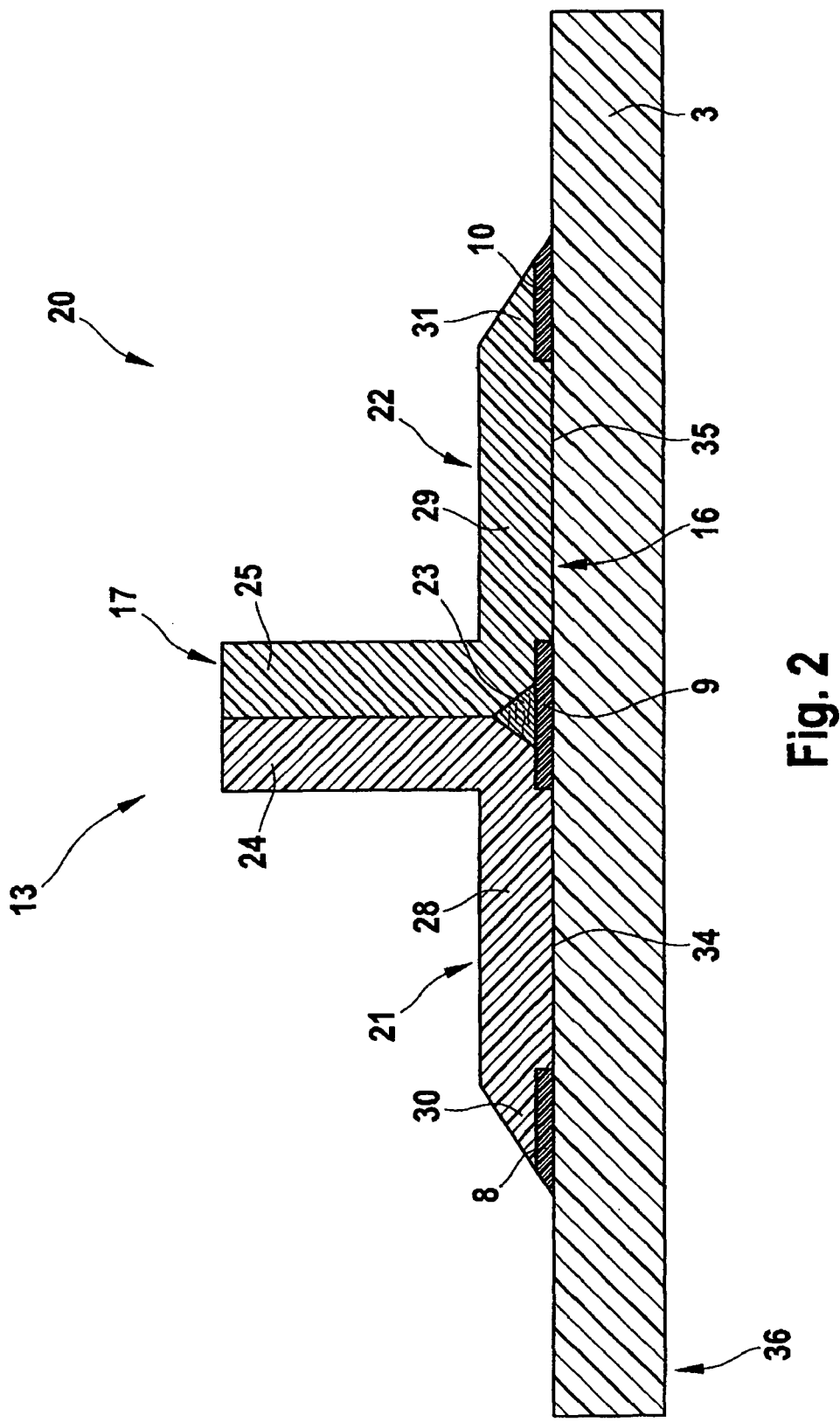
FIG. 2 shows the connecting structure that has been produced by the method from FIG. 1.

After fitting the skin shell 3 with the T stringers 11, 12, 13, this arrangement is cured under pressure and heat to form the connecting structure 20, as represented in FIG. 2.

It can be seen from FIG. 2 that the stringer 13 is formed substantially from two L-shaped layers of CRP 21 and 22. The layers 21, 22 are in turn subdivided into many layers of laid fiber fabric (not represented here). An interstitial filler 23, typically a strand of fibers, thereby fills a space that is not filled by the layers 21, 22.

The layers 21, 22 are respectively connected integrally to one another at their one leg 24, 25 and form the web portion 17.

The two other legs 28, 29 extend in mutually opposed directions and thereby together form the foot 16. The legs 28, 29 respectively have at their ends foot tips 30, 31, which are formed such that they are flattened towards the skin shell 3.

Also represented in FIG. 2 are the connecting regions 8, 9, 10, 34, 35. The connecting regions 8, 9, 10 in this case respectively comprise the thermoplastic material 5. The connecting regions 8 and 10 are respectively arranged at the end of the legs 28, 29 under the foot tips 30, 31. The connecting region 9 is formed underneath the interstitial filler 23.

Furthermore, the foot 16 of the stringer 13 is connected to the skin shell 3 by means of the connecting regions 34, 35. In these regions, the connection is performed by means of adhesive bonding of the resin matrix in the layers 21, 22 with the resin matrix in the skin layer 3.

If, for example, an impact then acts on the skin shell 3 at the point 36, the flux of force resulting from the impact 36 is introduced into the stringer 13 via the connecting regions 8, 9, 10, 34, 35. In the connecting regions 8, 10, the flux of force changes its direction from the skin shell 3 into the stringer 13, and in the connecting region 9 the deflection of the flux of force takes place from the foot 16 into the web portion 17. Therefore, at the points at which a considerable directional change of the flux of force occurs, namely in the connecting regions 8, 9 and 10, the thermoplastic material is preferably provided according to the invention. Therefore, energy absorption or damping is achieved in these connecting regions 8, 9, by means of the invention.

The connecting regions 34, 35 have a lower energy absorbing capacity than the connecting regions 8, 9, 10, but in return may have a higher tensile strength.

Figure 3:
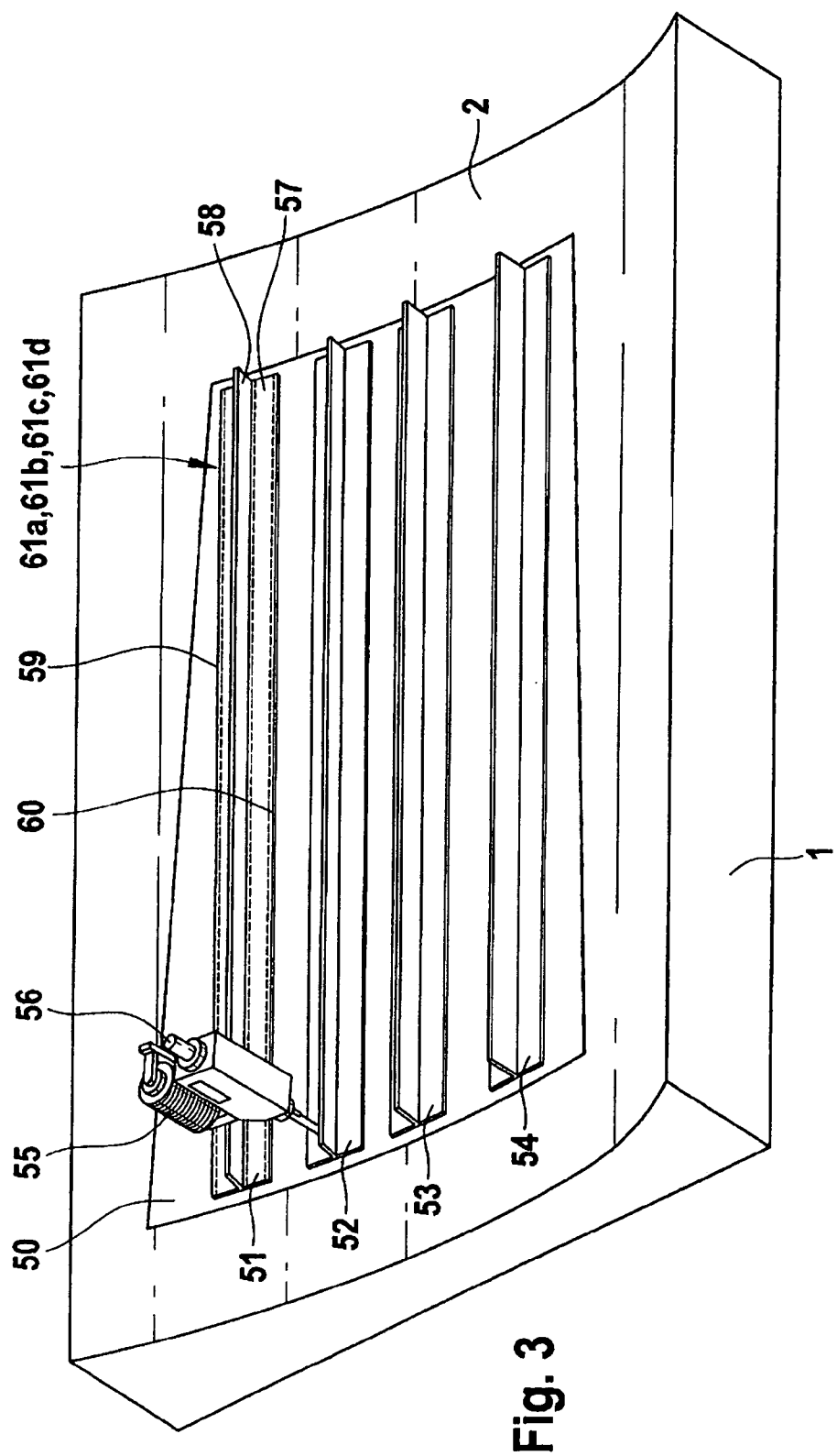
FIG. 3 shows a state of the method in the production of a connecting structure according to a further exemplary embodiment of the present invention, the thermoplastic material being introduced as sewing thread.

FIG. 3 likewise shows the laminating device 1 and the contour 2. The contour 2 is in this case of such a form that it shapes a skin shell 50, which lies on the contour 2 as a dry laid fiber fabric. T stringers 51, 52, 53, 54 are arranged on the skin shell 50. The T stringers 51 . . . 54 thereby likewise take the form of dry, in particular interwoven, laid fiber fabrics.

Subsequently, the T stringers 51 . . . 54 are sewn to the skin shell 50 by means of a sewing device 56, which provides a thermoplastic material 55. In this case, the foot 57 of the stringer 51 is sewn to the skin shell 50 in the longitudinal direction and adjacent to the web portion 58 or the foot tips 59, 60. Thermoplastic filaments, which may consist 100% of polyethylene, are used here as sewing threads 61a . . . 61d.

Figure 4:
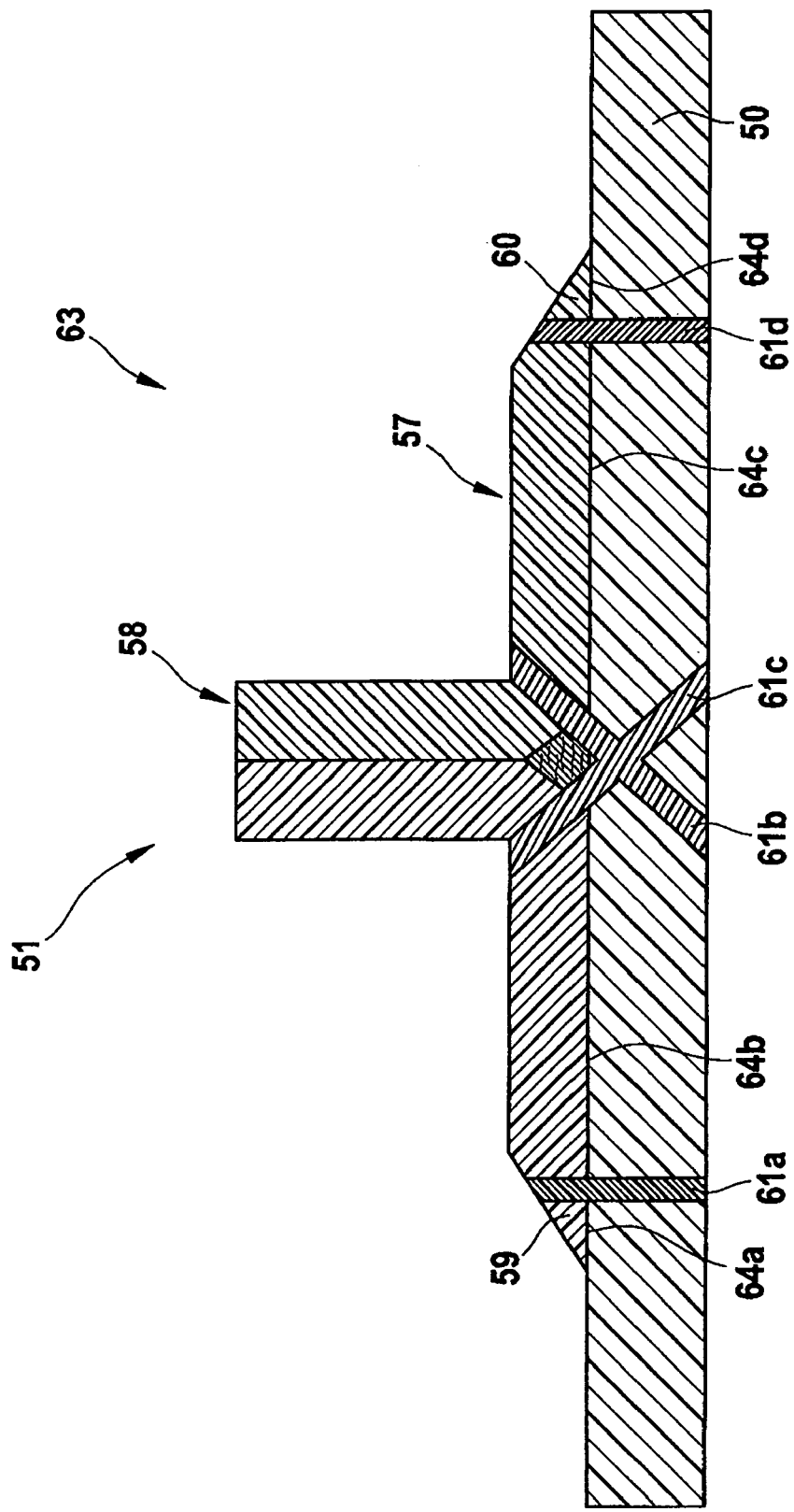
FIG. 4 shows the connecting structure that has been produced by the method from FIG. 3.

Subsequently, the arrangement comprising the skin shell 50 and the T stringers 51 . . . 54 is impregnated with a matrix, in particular an epoxy resin matrix, for example in a vacuum infusion process. In a further method step, the arrangement impregnated with resin is cured by heat and pressure, for example in an autoclave, to form the connecting structure 63 represented in FIG. 4.

Components that are not described any further correspond to those from FIG. 2. The sewing threads 61a and 61d fix the foot tips 59 and 60 to the skin shell 50 and thereby form first and second connecting regions. The sewing threads 61b and 61c extend to the right and left sides of the web portion 58, for example they cross over as they pass through the foot 57 and the skin shell 50 and thereby form third and fourth connecting regions. The first to fourth connecting regions serve for absorbing energy, for example resulting from impact.

Furthermore, connecting regions 64a . . . 64d are provided, the foot 57 being adhesively bonded to the skin shell 50 by means of resin. These connecting regions 64a . . . 64d may have a lower energy absorbing capacity than the connecting regions 61a . . . 61d, but have in return a higher maximum tensile strength (N/mm$^2$), that is to say the stress that causes failure when it is exceeded, in these connecting regions 64a . . . 64d.

Detachment of the stringers 13, 58 from the skin shells 3, 50 resulting from impact 36 can consequently be effectively prevented.

The invention is not restricted to the specific connecting structure represented in the figures or to the method for producing such a connecting structure.

The individual sequence of individual method steps of the method according to the invention can be changed in various ways. The form taken by the individual method steps can themselves also be modified. For example, in the method represented in FIG. 3, a wet stringer may be used instead of a dry stringer, or else a stringer with a cured web portion and a wet foot.

Furthermore, the geometry of the skin shell and the stringers can be modified in various ways. Instead of T stringers, Ω stringers which are connected to a skin shell in the region of their foot portions may also be used. "Stringer" is intended to mean any kind of stiffening element, that is to say for example a frame.

It is also conceivable for only one connecting region to be provided between the stringer and the structural component, this entire connecting region being provided with thermoplastic material.

What is claimed is:

1. A connecting structure for an aircraft or spacecraft, comprising a structural component and a stringer, which is connected to the structural component by at least one first connecting region and at least one second connecting region respectively,
   Wherein the first connecting region has a high impact material for an increased energy absorbing capacity of the first connecting region, the second connecting region does not have the high impact material, wherein the high impact material is a thermoplastic material, and
   wherein the stringer is in direct contact with the structural component at the second connecting region.

2. The connecting structure according to claim 1, wherein the structural component comprises a fiber composite material or the stringer comprises a fiber composite material.

3. The connecting structure according to claim 2, wherein the thermoplastic material has a greater thermoplastic component than the respective fiber composite materials.

4. The connecting structure according to claim 1, wherein the thermoplastic component of the thermoplastic material amounts to between 5% and 100%.

5. The connecting structure according to claim 1, wherein the stringer comprises a foot portion for resting on the structural component or a web portion, which is aligned substantially perpendicularly in relation to the structural component.

6. The connecting structure according to claim 5, wherein the high impact material is arranged in the end region of the foot portion that is facing away from the web portion or in the region of the foot portion that is adjacent to the web portion.

7. The connecting structure according to claim 1, wherein the thermoplastic material is a sheet-like textile formation, laid fiber fabric or crosslinked thermoplastic grains.

8. A method for producing a connecting structure for an aircraft or spacecraft, with the following method steps:
   Providing a structural component and a stringer, which can be connected to one another by at least one first connecting region and at least one second connecting region;
   introducing a high impact material into the first connecting region to provide a local increase in the energy absorbing capacity of the first connecting region; and
   joining together the structural component and the stringer by the connecting regions,
   wherein the second connecting region does not have the high impact material and the stringer is in direct contact with the structural component at the second connecting region.

9. The method according to claim 8, wherein the high impact material is a thermoplastic material.

10. The method according to claim 9, wherein the thermoplastic component of the thermoplastic material is chosen to be, in terms of percentages by weight, between 5% and 100%.

11. The method according to claim 10, wherein the thermoplastic component of the thermoplastic material is chosen to be, in terms of percentages by weight, between 50% and 80%.

12. The method according to claim 8, wherein the arrangement comprising the structural component, the stringer and the connecting regions are cured by pressure or heat to form the connecting structure.

13. The method according to claim 8, wherein a resin matrix, in particular an epoxy resin, is introduced into the structural component and the stringer.

14. The method according to claim 8, wherein the structural component or the stringer is provided as a semifinished fiber product, prepreg material or at least partially cured fiber composite material.

15. The method according to claim 8, wherein the high impact material is arranged between a foot portion of the stringer and the structural component.

16. The method according to claim 8, wherein the high impact material is introduced as a sheet-like textile formation, laid fiber fabric, powder or aerosol.

\* \* \* \* \*